United States Patent
Zega

(10) Patent No.: US 11,366,642 B1
(45) Date of Patent: Jun. 21, 2022

(54) CHANGE MIGRATION: PROCESSES FOR ENSURING SUCCESSFUL DEPLOYMENT OF DESIGN CHANGES

(71) Applicant: Bank of America Corporation, Charlotte, NC (US)

(72) Inventor: Douglas Zega, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 14 days.

(21) Appl. No.: 17/184,822

(22) Filed: Feb. 25, 2021

(51) Int. Cl.
| | | |
|---|---|---|
| *G06F 9/44* | (2018.01) | |
| *G06F 9/455* | (2018.01) | |
| *G06F 9/445* | (2018.01) | |
| *G06F 8/20* | (2018.01) | |
| *G06N 5/02* | (2006.01) | |
| *G06F 11/36* | (2006.01) | |
| *G06F 8/71* | (2018.01) | |

(52) U.S. Cl.
CPC .................. *G06F 8/20* (2013.01); *G06F 8/71* (2013.01); *G06F 11/3664* (2013.01); *G06N 5/02* (2013.01)

(58) Field of Classification Search
CPC .......... G06F 8/20; G06F 8/71; G06F 11/3664; G06N 5/02
See application file for complete search history.

(56) References Cited

U.S. PATENT DOCUMENTS

| | | | |
|---|---|---|---|
| 6,546,404 B1 | 4/2003 | Davis et al. | |
| 6,981,005 B1 | 12/2005 | Cabrera et al. | |
| 7,765,189 B2 | 7/2010 | Yamakawa | |
| 10,248,396 B1 * | 4/2019 | Wiggins | .................... G06F 8/71 |
| 10,481,806 B2 | 11/2019 | Mehrotra et al. | |
| 10,585,862 B2 | 3/2020 | Pazdziora et al. | |

(Continued)

OTHER PUBLICATIONS

Nacha Chondamrongkul, Automated Planning for Software Architectural Migration, 2020, pp. 216-224. https://ieeexplore.ieee.org/stamp/stamp.jsp?tp=&arnumber=9376199 (Year: 2020).*

(Continued)

*Primary Examiner* — Mongbao Nguyen
(74) *Attorney, Agent, or Firm* — Weiss & Arons LLP

(57) ABSTRACT

A method for ensuring successful deployment of a plurality of design changes from development to user acceptance testing. The method may include exporting a development file from development to user acceptance testing, generating, based on the exporting, a plurality of skip files as an aggregated Extensible Markup Language export (XML-export) script, and opening, using an Extensible Markup Language table (XML-table) utility in Excel™ (Windows, Mac), the aggregated XML export script. The method may also include creating an aggregated XML schema based on the aggregated XML export script, retrieving a first code from the aggregated schema that identifies the action to which a member of the aggregated schema pertains, and retrieving a second code from the member of the aggregated schema that identifies a Rational Security Assessment Manager Identifier (RSAM ID) to which the member of the aggregated schema pertains. The method may use the first and second codes to determine an event handler name to which the member of the aggregated schema pertains.

6 Claims, 8 Drawing Sheets

(56) References Cited

U.S. PATENT DOCUMENTS

| | | | | |
|---|---|---|---|---|
| 2005/0038881 | A1* | 2/2005 | Ben-Itzhak | H04L 63/1433 |
| | | | | 709/223 |
| 2019/0361767 | A1* | 11/2019 | Karthik | G06F 11/0781 |
| 2021/0081379 | A1* | 3/2021 | Buehne | G06F 16/182 |

OTHER PUBLICATIONS

Maja Vukovic, Cloud Migration using Automated Planning, 2016, pp. 96-103. https://ieeexplore.ieee.org/stamp/stamp.jsp?tp=&arnumber=7502801 (Year: 2016).*

* cited by examiner

302

| Skipped | Will not be imported RA_EVENT_EVENTHANDLER - EVENT_EVENTHANDLER_ID: 15087 because —310 WF_BUTTON_ID_R(WF_BUTTON_RSAM_ID : BAIM01 29B8374046C9406896F8A6CB8EE233F0) does not exists | —316 -00002245 - | } 304 |
| Skipped | Will not be imported RA_EVENT_EVENTHANDLER - EVENT_EVENTHANDLER_ID: 15088 because —312 WF_BUTTON_ID_R(WF_BUTTON_RSAM_ID : BAIM01 29B8374046C9406896F8A6CB8EE233F0) does not exists | —318 -00002245 - | } 306 |
| Skipped | Will not be imported RA_EVENT_EVENTHANDLER - EVENT_EVENTHANDLER_ID: 15089 be cause —314 WF_BUTTON_ID_R(WF_BUTTON_RSAM_ID : BAIM01 29B8374046C9406896F8A6CB8EE233F0) does not exists | —320 -00002245 - | } 308 |

FIG. 3

| P60 ▽ : × ✓ ƒx | 15087 | |
|---|---|---|
| | NAME2 | ▽VALUE |
| 34 | EVENTHANDLER IF R | |
| 35 | ACTION NAME | Change WFS to Assessment |
| 36 | ACTION TYPE R | |
| 37 | ACTION STRING | #T1=#C1=0-#DV1=#DP1=0-#SSV1+BAIM01-00000885-F35AABBE1C7FF446 |
| 38 | ACTION ORDER | 1 |
| 39 | EVENTHANDLER ACTION RSAM ID | BAIM01-00040558-90598b5A48E9419FAAFFC95A604bF9D |
| 40 | ACTION COMMAND FX | NULL |
| 41 | ACTION COMMAND | NULL |
| 42 | ACTION DATA FX | NULL |
| 43 | ACTION DATA | NULL |
| 44 | ACTION RETURN PARAMETERS | 0 |
| 45 | ACTION DO NOT LOG | 0 |
| 46 | ACTION CUSTOMIZE VWF | NULL |
| 47 | ACTION CONNECTOR TYPE | NULL |
| 48 | ACTION SP FILE OVERWRITE | |
| 49 | | |
| 50 | | |
| 51 | | |
| 52 | EVENTHANDLER CRITERIA ID | 29749 |
| 53 | EVENTHANDLER ID R | |
| 54 | CRITERIA NAME | Check All required fields |
| 55 | CRITERIA TYPE R | |
| 56 | CRITERIA STRING | #T1=#T2=#C1+4-#DT2=0-#V1=#DV2=#DP1=0-#DP2=0-#SSV1=0-#MSV1=R |
| 57 | CRITERA ORDER | 1 |
| 58 | EVENTHANDLER CRITEREA RSAM ID | BAIM01-0029749-6686A6FA1D904DBB905C9DF6A8F886E0 |
| 59 | | |
| 60 | EVENT EVENTHANDLER ID | 15087 |
| 61 | EVENT ID R | |

FIG. 4

| | NAME2 | VALUE |
|---|---|---|
| 2 | | 7136 |
| 3 | EVENTHANDLER ID | BOA-PRIV- Check fields Required for Assessment(803) |
| 4 | EVENTHANDLER NAME | All fields on the Privacy Details Tab are required |
| 5 | EVENTHANDLER DESC | 1 |
| 6 | EVENTHANDLER TYPE | BAIM01-01736D558-90598b5A48E9419FAAFFC95A604bF9D |
| 7 | EVENTHANDLER RSAM ID | 7137 |
| 8 | EVENTHANDLER ID | BOA-PRIV- Assessment Request Send Emails(803) |
| 9 | EVENTHANDLER NAME | |
| 10 | EVENTHANDLER DESC | 0 |
| 11 | EVENTHANDLER TYPE | BAIM01-01738558-90598b5A48E94KJL45989E65E489EBRE |
| 12 | EVENTHANDLER RSAM ID | 7138 |
| 13 | EVENTHANDLER ID | BOA-PRIV- Assessment Request Process(803) |
| 14 | EVENTHANDLER NAME | Definitions in the user roles will say who can edit and not |
| 15 | EVENTHANDLER DESC | 1 |
| 16 | EVENTHANDLER TYPE | BAIM01-00007139-18916VE8914DVE95V1EA98H84R9HJ9J |
| 17 | EVENTHANDLER RSAM ID | 40557 |
| 18 | EVENTHANDLER ACTION ID | |
| 19 | EVENTHANDLER ID R | Send Email to Governance Group |
| 20 | ACTION NAME | |
| 21 | ACTION TYPE R | #T1=#T2=#C1+4-#DT2=0-#V1=-#DV2=#DP1=0-#DP2=0-#SSV1=0-#MSV1=R |
| 22 | ACTION STRING | 1 |
| 23 | ACTION ORDER | BAIM01-0040057-56EBER956269E595B89EF9F59EF2A9ARBR |
| 24 | EVENTHANDLER ACTION RSAM ID | NULL |
| 25 | ACTION COMMAND FX | NULL |
| 26 | ACTION COMMAND | NULL |
| 27 | ACTION DATA FX | NULL |
| 28 | ACTION DATA | 0 |
| 29 | ACTION RETURN PARAMETERS | 0 |
| 30 | ACTION DO NOT LOG | NULL |
| 31 | ACTION CUSTOMIZE VWF | NULL |
| 32 | ACTION CONNECTOR TYPE | 40558 |
| 33 | ACTION SP FILE OVERWRITE | |
| 34 | EVENTHANDLER ACTION ID | Change WFS to Assessment |
| 35 | EVENTHANDLER ID R | |
| | ACTION NAME | |

FIG. 5

← → ⟲ ⌂ ⓘ workflow/rsam/WEBADMIN/abc?de=fg123

::: Apps  ⟩Rsam Login  ☰ Issues  ⓘ Fundamentals

Export Details

Select the RSAM Items to Export

| RSAM ITEMS |
|---|
| ☐ Admin Groups |
| ☐ Attribute Type |
| ☐ Charts |
| ☐ Connectors |
| ☐ Control Type |
| ☐ Criticality Factor Type |
| ☐ Criticality Type |
| ☐ Domain Type |
| ☐ Email Listener |
| ☐ Sys Option |
| ☐ Syslog listener |
| ☐ Users |
| ☐ Workflow Button |
| ☐ Workflow State |

Individual Records

| | ID | Admin Name | Description | Button Order | Rsam ID |
|---|---|---|---|---|---|
| ▽ | ▽ | ▽ | ▽ | | ▽ BAIM01-00245-89B83740468696FA6CBEE223F0 |
| ☐ | 2245 | BOA-PRIV: Submit for Assessment(803) | Checks all fields | 284 | BAIM01-00245-89B83740468696FA6CBEE223F0 |

604  608  606  602

Check/Uncheck Selected    Records per page [100] [<<] [<] Page [1] of 1 [>] [>>]

[Export] [Save] [Save As] [Load] [Delete] [Close]

CHANGE MIGRATION: PROCESSES FOR ENSURING SUCCESSFUL DEPLOYMENT OF DESIGN CHANGES

FIELD OF TECHNOLOGY

Aspects of the disclosure relate to change migration. Specifically, this disclosure relates to processes for ensuring successful deployment of design changes across the software development cycle.

BACKGROUND OF THE DISCLOSURE

The normal process of software application development involves taking changes developed and tested, and migrating them to full production use. Software developers are required to check their work at all stages of development. This checking typically involves checking for coding bugs. This checking for coding bugs is a normal part of the migration process.

The code that an application developer writes is typically tested in a non-production development system (DEV), and progresses through User Acceptance Testing (UAT), in a separate version of the system, and finally to full production use. The process of moving changes from one version of a system to the next, is referred to as "migration".

During the migration process, it is often found that changes do not easily migrate from one version of a system to the next. When a change does not migrate cleanly—i.e., substantially independent of coding bugs, the faulty change may lead to failed releases in the production environment. These faulty changes may occur even when the changes were tested successfully in a development environment. This may cause delay in the development cycle, increase frustration among the development staff, and cause negative attitudes among users.

This loss of productivity can be critical to entity operations, to the extent that the entity relies on an efficient software development cycle. This may be especially true if the software development cycles involves processes which, themselves, implicate regulatory or risk ramifications. It is imperative that a developer ensure that substantially all changes migrate cleanly. Ensuring that changes migrate cleanly is typically always a manual, and often, a time-consuming, process.

SUMMARY OF THE DISCLOSURE

An article of manufacture including a non-transitory computer usable medium having computer readable program code embodied therein, the code when executed by one or more processors configuring a computer to execute a method for ensuring successful deployment of a design change from a development environment to a user acceptance testing environment is provided. The method may include exporting a development file from a development environment to a user acceptance testing environment and generating a skip file as an XML-export script. The skip file may key off of the development file and the generating may be based on the exporting.

The method may also include opening, using an Extensible Markup Language table (XML-table) utility in Excel™ (Window, Mac), the Extensible Markup Language export (XML-export) script. Thereafter, the method may include selecting an option to create an XML schema based on the XML export script. The method may further include retrieving a first code from the schema. The first code may identify the action to which the schema pertains. The method may also include retrieving a second code from the schema. The second code may identify the Rational Security Assessment Manager Identifier (RSAM ID) to which the schema pertains.

The method may also include using the first code and the second code to determine the event handler name to which the schema pertains.

In addition, the method may include using the RSAM ID and the event handler name to return to the XML-export script and correct the schema.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows an exemplary prior art skip file;

FIG. 4 shows an RSAM-generated XML file that has been opened using an XML-table utility of an Excel™ spreadsheet;

FIG. 5 shows another portion of the RSAM-generated XML file that has been opened using an XML-table utility of an Excel™ spreadsheet;

FIG. 6 shows yet another portion of the RSAM-generated XML file that has been opened using an XML-table utility of an Excel™ spreadsheet;

DETAILED DESCRIPTION OF THE DISCLOSURE

Figure 1:
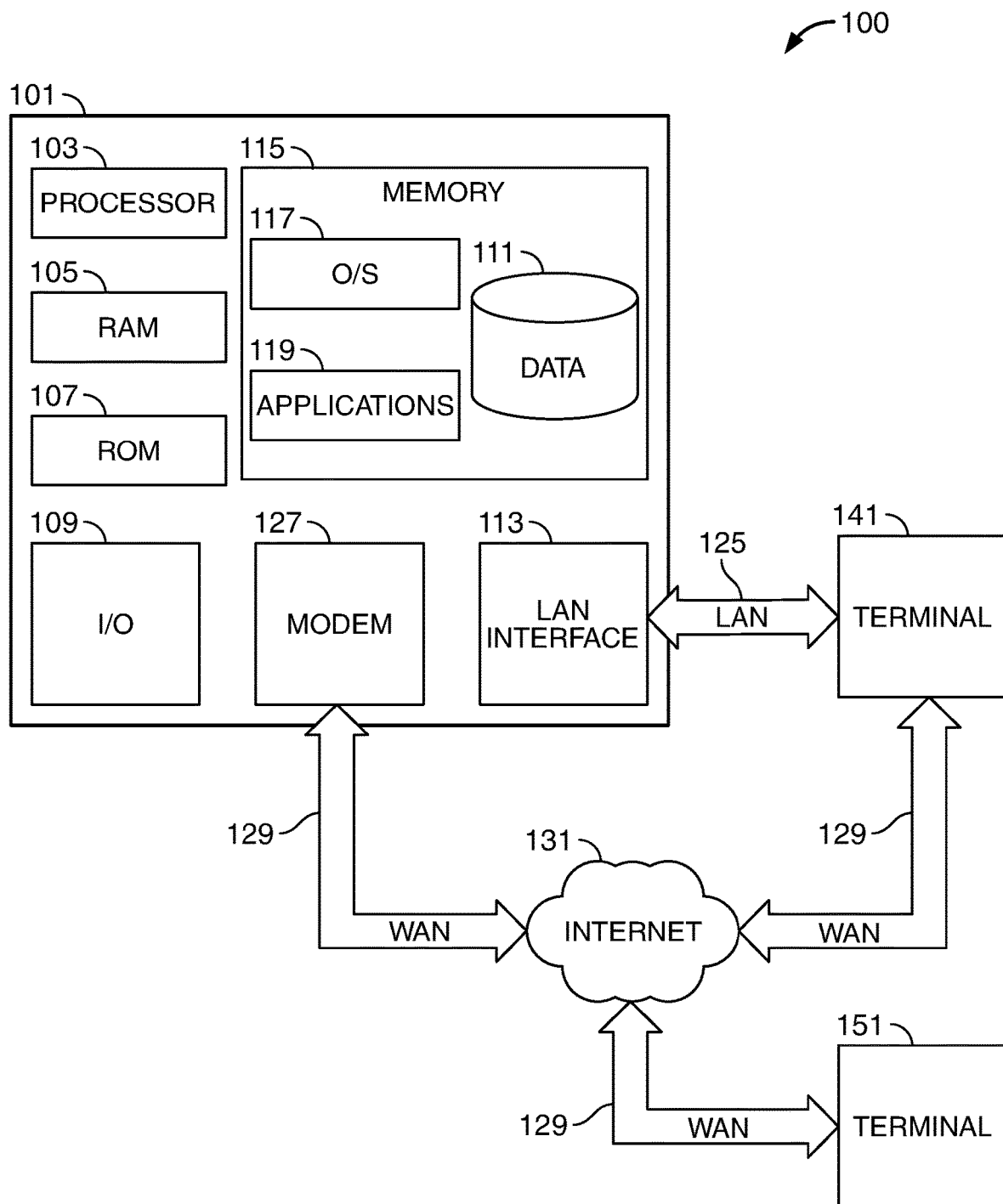
FIG. 1 shows an illustrative block diagram of system for in accordance with principles of the disclosure.

Different commercially available Global Risk and Compliance (GRC) software tools can involve proprietary ways of taking newly-developed features and exporting them to Extensible Markup Language (XML) files. The XML file, once created, may then be used for importation to the next environment, to receive those new changes. Some entities use a GRC database management system software system called RSAM™, which creates an XML file for use with processes according to the disclosure.

During many development efforts the DEV and UAT environments, contain different changes, or versions of changes. These changes, or versions of changes, are often out-of-sync with one another. This dissonance presents challenges to the developer because the UAT system often reject changes from DEV. These rejections, known as "Skips", are generated within RSAM and are exported out to an Excel™ file, which must be manually evaluated and corrected.

An example of a skip might involve a new process that a developer is creating. This process may have dependencies that may not exist in all environments. During migration, a skip may be produced that alerts the developer that one of the developer's changes will not migrate. The reason for the failure to migrate may include the fact that a dependency—i.e., an automatic addition, or deletion, of necessary code elements or other corollary function in code-migration— existed in the DEV environment but did not exist in the UAT environment. As such, the code may be searching for the dependency in the UAT system to no avail.

Alternatively, the migrated code in the UAT system may have generated a dependency that did not exist in the DEV system. However, the migration may have failed, at the UAT state, to take into account such a dependency and the dependency may go unsatisfied—thereby causing a skip.

In RSAM™, and other similar database management systems, the skip file may contain proprietary XML code. Typically, the manufacturer offers no automated way of matching the codes back to the actual design feature in the DEV system to further characterize, and/or help remediate, the skip.

In RSAM™ database management systems, for example, only two codes exist to aid the developer in identifying and clearing the skip. The first code may identify the target to be modified, and the second may identify the actual change being migrated.

Developers working manually should also first determine a target to which the target code pertains. Often, determining the target involves using a third-party Sequel™ (SQL) tool to review the code.

The developer must use the SQL tool to search through RSAM database tables to identify, based on the first code, the target. After determining the identity of the target, the user must perform this process once again—this time using the second code to determine what change to the target caused the skip.

Illustrative processes, according to the disclosure, that follow, include examples of a skip file, and the XML file containing a developer's changes. These illustrative processes describe a methodology, preferably using automated macros, for a system to use that manufacturer's own XML file, and quickly determine both target and cause of the skip. Further, these illustrative processes describe a methodology, preferably using artificial intelligence (AI), for automatically remediating the skip.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to cash verification and remote deposit. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to generating skip files, schemas associated therewith, and correcting same.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
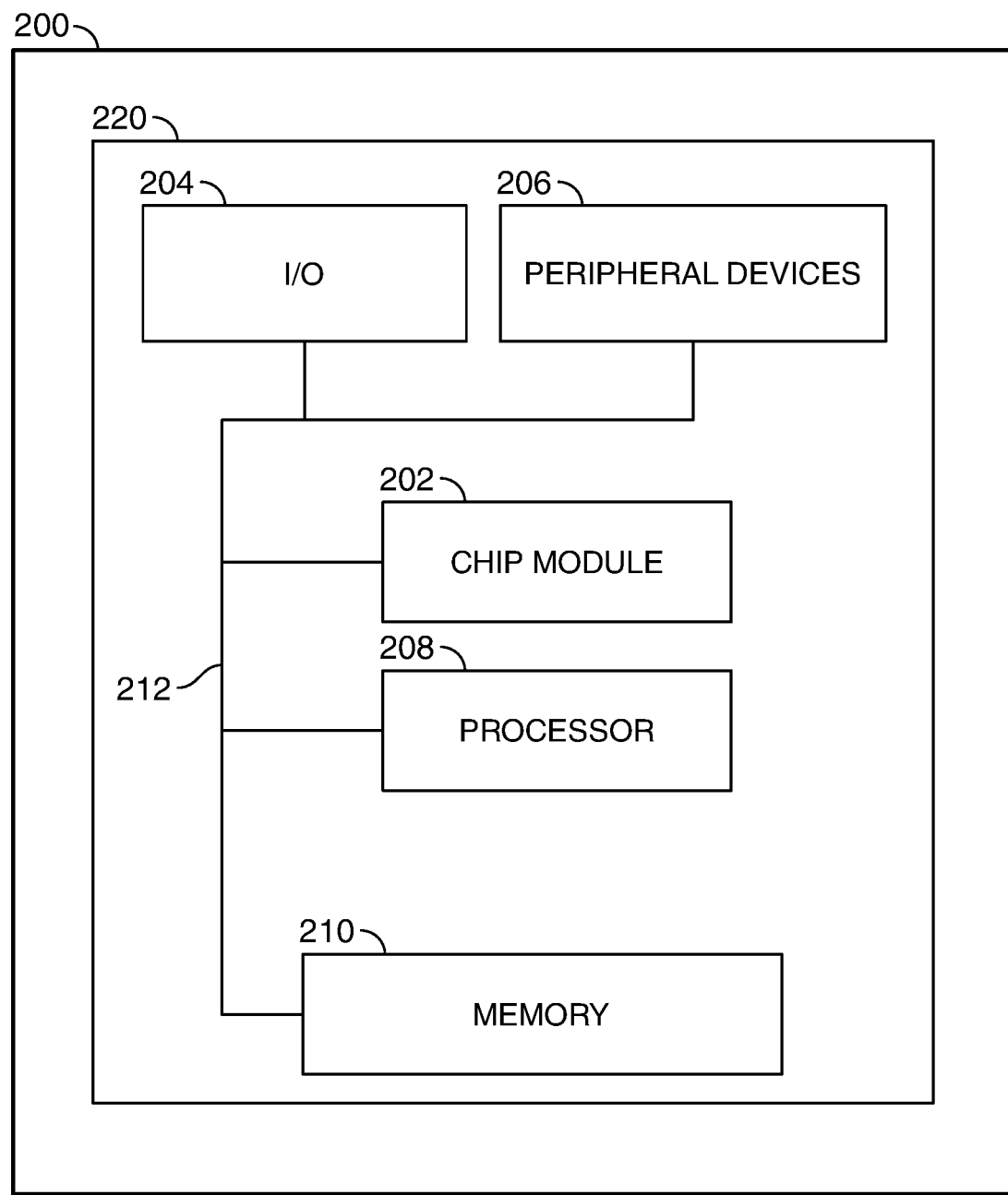
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3 shows an exemplary prior art skip file 302 for use according to the principles of the disclosure. Exemplary skip file 302 is an XML export script that appears as is when it is opened in a text or notepad application.

Skip file 302 has been generated in the context of a developer's attempt to migrate three new processes. These processes are referred to as "Handlers" in RSAM™.

The developer may intend that the new processes should be triggered by the click of a button. The developer has included the processes in the XML export script.

The physical button(s) itself for display on a screen, however, that would be used to trigger the processes, has not been included in the XML export script. The developer may not have been aware that the button did not exist, or was not automatically created, in the UAT environment. Accordingly, the developer may not have been aware that the button needed to be exported in the XML export script to the UAT environment. Thus, the XML export script lacks the button needed.

This is but one example of developer coding error that generates a skip file. FIG. 3 shows each of skip files 304, 306 and 310. FIG. 3 also shows first codes 310, 312 and 314, each of which identifies the actions to which the skip pertains. In addition, FIG. 3 also shows second codes 316, 318 and 320 which identifies the RSAM ID (or other suitable ID) to which the skip pertains.

There typically are numerous processes being migrated, and the list of skips is often quite lengthy. Therefore, it is not always evident, and can be cumbersome and time-consuming, to determine the action and identification of the coding problem to which a skip file pertains.

After receiving the skip file, the developer must decipher what event handler is causing the skip, and to what other functionality, (in this case, a button), does the skip file pertain.

FIG. 4 shows an RSAM-generated XML file that has been opened using an XML-table utility of an Excel™ spreadsheet. The RSAM-generated XML-file may be generated in response to a developer's efforts in preparing a file for export from a development (DEV) environment to a User's Acceptance Testing (UAT) environment and then, finally, to a production environment.

In methods according to the current disclosure, the developer specifically opens the RSAM-generated XML file in Excel™ with the option selected that the XML export file is an XML table. If for some reason the RSAM-generated file is not an XML file, and it is selected to be opened as an XML table, it can be rejected as failing to include any XML information.

After the developer opens the RSAM-generated XML export file as an XML table in Excel™, the developer is preferably prompted to select, and should select, the step of allowing "Excel to create a schema based on the XML source Data". Following the creation of the schema, a developer is then ready to perform the following steps:

Step 1. The developer searches, or a search is automatically performed, using a known Excel™ search and/or filter utility(s), for the "10587" identified in the first skip file. The search retrieves, at line 60, the 10587 identified in the first skip file.

Step 2: After the number of the action to which the skip pertains has been identified, the user can further identify, or it can be automatically identified in a suitable fashion, what the action is. In this particular example, the action 10587 corresponds to "Change WFS to Assessment."

It should be noted that "[c]hange WFS to Assessment is an "Action"—i.e., one of the steps—that a developer would have defined in a button process. 'WFS', in this exemplary case, specifically refers to 'Workflow State', and can be considered for the purposes of this application as a status of some database record. Other examples of states according to the invention include "Draft", "In Progress", "Awaiting Review", "Approved", "Rejected", "Completed" and/or other suitable states. This particular exemplary process was intended to change the workflow state to "MT—Assigned" in process FIG. 5 shows that, at line 3, which can be located by a user scrolling further upward, or by using some other suitable automated action, such as a search and/or a filter action, the support can also locate the name of the event handler involved with the skip file. In this particular case, line 3 shows "BOA-PRIV Check fields Required for Assessment." This is the EVENTHANDLER-NAME associated with the skip.

FIG. 6 shows that, once the developer has the event handler name 604, the developer can further obtain additional information.

Specifically, by using the RSAM ID 602 within the skip file, ("BAIM01-00002245-29B8374046F8A6CB8EE233F0"), together with the event handler name 604, the developer possesses sufficient information to return to the export file- and query based on RSAM ID 602 within the skip file.

At this point, the developer can confirm that, in this example, the developer failed to select the workflow button as part of the developer's migration process, as shown at 606, as a description to check all fields, and 608, as a button order. The developer can further confirm this process by searching for the same button "Admin Name" in the UAT environment, and finding that it will not exist there.

In general, the claimed process uses a combination of the manufacturer's own-generated files, together with off-the-shelf tools in processes according to the disclosure. These processes can be manual, which may take more time (albeit less than legacy manual prior art processes which take longer), or automated. The automated processes, according to the disclosure, can preferably invoke software specific processes such as a search/filter processes and suitable remediation processes and/or strategies.

These processes according to the disclosure can quickly analyze the skip file, and be used to report, and/or correct, errors in the migration process. The processes according to the disclosure fill a void because, typically, no documented processes exist, nor is any guidance available, regarding analyzing and remediating the skip files.

Figure 7:
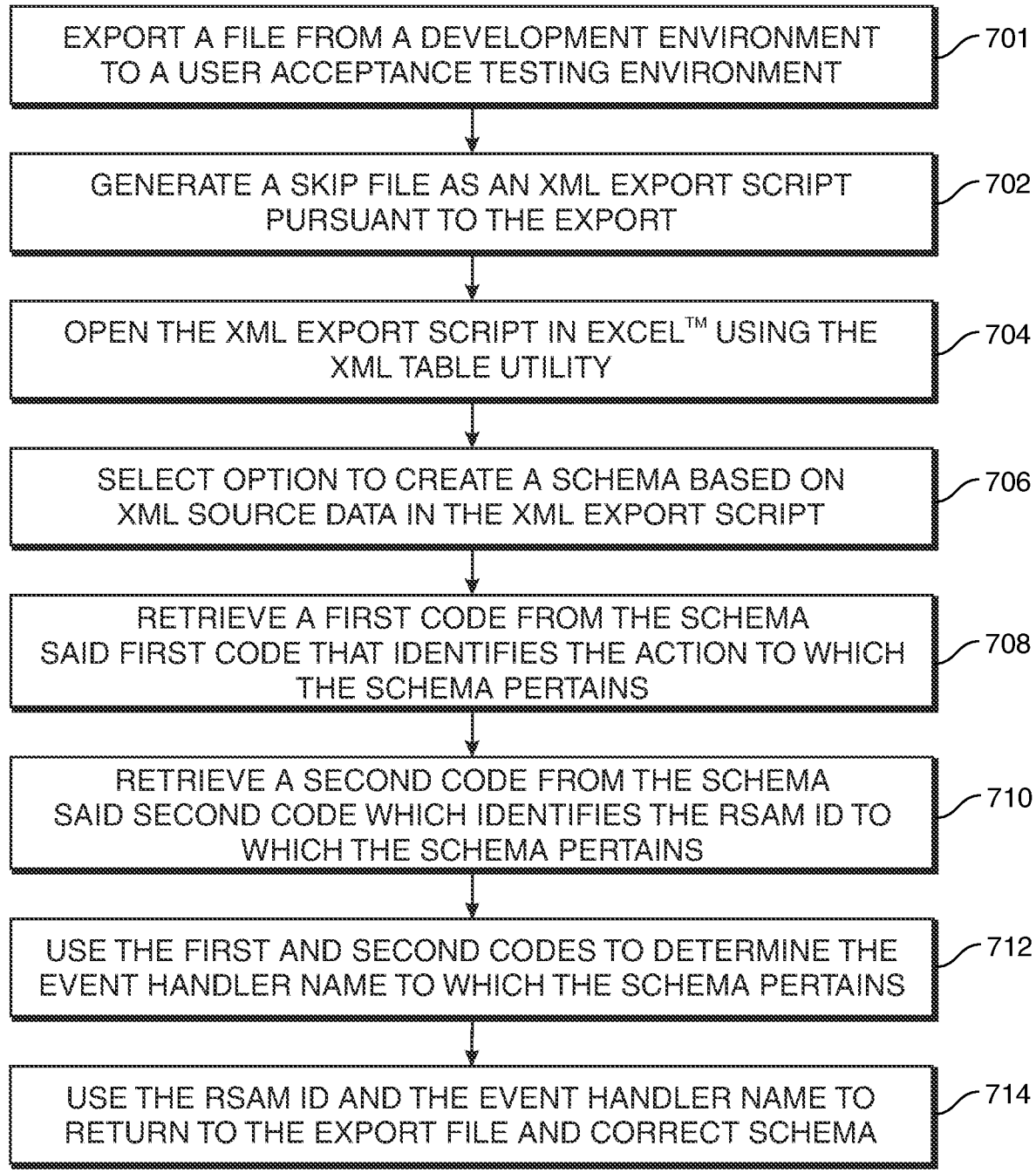
FIG. 7 is an illustrative flow diagram in accordance with the principles of the disclosure.

FIG. 7 shows an illustrative flow diagram of a method for administering one or more processes according to the disclosure. It should be noted that such processes may preferably be implemented using a macro, or other data object, data structure, or module, developed in an Excel™ Software Development Kit (SDK), or through other suitable platforms.

At 701, a file of code is exported from a development environment to a user acceptance testing environment. Following export, the method shows, at 702, generating a skip file as an XML export script. Step 702 also shows that the generating is performed pursuant the exporting in step 701.

Step 704 shows opening the XML export script in Excel™. This should preferably be done using an XML table utility which is available in Excel™. Other suitable XML utilities in Excel™ or other suitable spreadsheet application, may also be invoked to open the XML export script.

At 706, the flow diagram shows that the macro, or other automated platform, should preferably invoke an option to create a schema based on the XML source data.

Once the schema is created, the macro can select a first code from the schema, as shown at 708. The first code should preferably identify the action to which the schema pertains.

At 710, the macro can select a second code from the schema. The second code may preferably identify the RSAM ID to which the schema pertains.

Step 712 shows using the first and second codes to determine the event handler name of the event to which the schema pertains. The event handler name preferably identifies the event to which the skip file pertains.

Preferably, the RSAM ID and the event handler name may be invoked to return to the export file and correct the schema as necessary. Once the schema is corrected, it can be implemented, as shown at 714, to prepare the export file for a seamless export. In the foregoing steps it has been taught that an automated process may be invoked to clear skip files following the export of code prepared in a DEV environment to a UAT environment.

Figure 8:
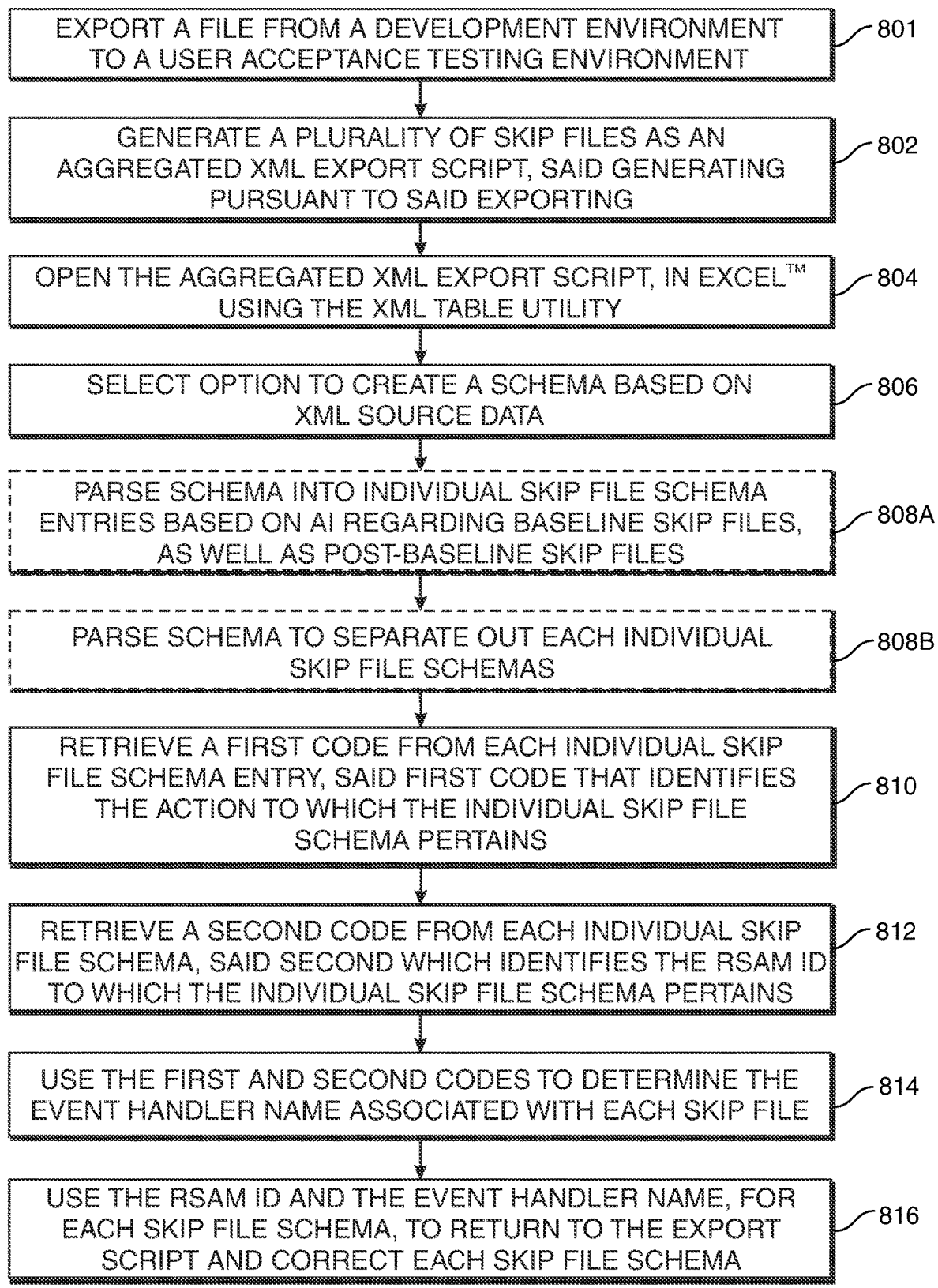
FIG. 8 is another illustrative flow diagram in accordance with the principles of the disclosure.

FIG. 8 shows another illustrative flow diagram of methods for administering one or more processes according to the disclosure. Step 801 shows exporting a file from a DEV environment to a UAT environment.

Step 802 shows generating a plurality of a skip files as an aggregated XML export script, whereby the generating is pursuant the exporting.

At step 804, the method (as implemented as a macro, or in some other suitable structure) may open the aggregated XML export script in Excel™. This may be accomplished using, for example, an XML-table utility which is available in Excel™. Typically, opening an XML export script with the XML-table will invoke a prompt to create a schema based on XML source data, as shown at 806. The prompt should be accepted and a schema formed.

Once formed, the method teaches, optionally at 808A, to parse the schema based on artificial intelligence regarding a baseline set of skip files, as well as based on post-baseline received skip files.

Alternatively, in another optional step 808B, the method teaches parsing the schema to separate out each individual skip file schema, preferably independently of any legacy skip files.

At 810, the method may include retrieving a first code from each individual skip file schema. The first code may preferably identify the action to which the individual skip file schema pertains. In addition to using AI to parse the schema, AI may also be used to correct schemas and/or skip files, where necessary. For example, pre-loaded and/or legacy remediation files may be loaded into an A/I system or library. One or more of these pre-loaded files may be implemented in response to receiving a skip file or schema associated therewith, and comparing the received file to the library of remediation files. This comparison may be used to implement a suitable remediative approach to the skip file. To the extent that the remediation was implemented, the results of the implementation can be added to the library, with the process invoked, and thus the AI library can continually be built using internally-generated remediations.

At 812, the method may include retrieving from each individual skip file schema a second code. The second code preferably identifies the RSAM ID to which the individual skip file schema pertains.

Thereafter, the method may use the first and second codes to determine the event handler name associated with each individual skip file, as shown at 814. Finally, the method may include using the RSAM ID and the event handler name for each skip file schema to return to the export script and correct each skip file schema.

Thus, change migration processes for ensuring successful deployment of design changes are provided. Persons skilled in the art will appreciate that the present invention can be practiced by other than the described embodiments, which are presented for purposes of illustration rather than of limitation. The present invention is limited only by the claims that follow.

What is claimed is:

1. A non-transitory computer usable medium having computer readable program code embodied therein, the code when executed by one or more processors configuring a computer to execute a method for ensuring successful deployment of a design change from a development environment to a user acceptance testing environment, the method comprising:
   exporting a development file from a development environment to a user acceptance testing environment;
   generating a skip file as an Extensible Markup Language export (XML-export) script, said skip file that keys off of the development file, said generating being based on the exporting;
   opening, using an Extensible Markup Language table (XML-table) utility in Excel Macros, the XML-export script;
   selecting an option to create an Extensible Markup Language (XML) schema based on the XML-export script;
   retrieving a first code from the XML schema, said first code that identifies the action to which the XML schema pertains;
   retrieving a second code from the XML schema, said second code that identifies a Rational Security Assessment Manager Identifier (RSAM ID) to which the XML schema pertains;
   using the first code and the second code to determine an event handler name to which the XML schema pertains;
   using the RSAM ID and invoking the event handler name to return to the XML-export script and correct the XML schema; and
   repeating the method for a plurality of skip files;
   wherein the repeating the method comprises parsing a single aggregated file into a plurality of skip files, said parsing comprising using artificial intelligence to parse said single aggregated file,
   wherein said using artificial intelligence to parse said single aggregated file comprises determining a baseline characteristic for the parsing based on a set of legacy skip files and a set of previously-generated skip files,
   wherein said using artificial intelligence to parse said single aggregated file further comprises using artificial intelligence for automatically remediating the skip files.

2. The non-transitory computer usable medium of claim 1 further comprising using an Excel Macros Software Development Kit to prepare an Excel macro, said macro that implements the method absent human intervention.

3. A non-transitory computer usable medium having computer readable program code embodied therein, the code when executed by one or more processors configuring a computer to execute a method for ensuring successful deployment of a plurality of design changes from a development environment to a user acceptance testing environment, the method comprising:
   exporting a development file from a development environment to a user acceptance testing environment;
   generating a plurality of skip files as an aggregated Extensible Markup Language export (XML-export) script, said plurality of skip files that key off the development file, said generating being based on the exporting;
   opening, using an Extensible Markup Language table (XML-table) utility in Excel Macros, the aggregated XML-export script;
   selecting an option to create an aggregated Extensible Markup Language (XML) schema based on the aggregated XML-export script;
   retrieving a first code from the aggregated XML schema, said first code that identifies the action to which a member of the aggregated XML schema pertains;
   retrieving a second code from the member of the aggregated XML schema, said second code that identifies an Relational Security Assessment Manager identifier (RSAM ID) to which the member of the aggregated XML schema pertains;
   using the first code and the second code to determine an event handler name to which the member of the aggregated XML schema pertains;
   using the RSAM ID and invoking the event handler name, for each member of the aggregated XML schema, to return to the export script and correct each skip file in the aggregated XML schema; and
   parsing the aggregated XML schema into a plurality of skip file schemas, said parsing comprising using artificial intelligence to parse said aggregated XML schema;
   wherein said using artificial intelligence to parse said aggregated XML schema comprises determining a baseline characteristic for the parsing based on a set of legacy skip file schemas and a set of previously-generated skip files;
   wherein said using artificial intelligence to parse said aggregated XML schema further comprises using artificial intelligence for automatically remediating the skip files.

4. The non-transitory computer usable medium of claim 3 further comprising using an Excel Macros Software Development Kit to prepare an Excel macro, said macro that implements the method absent human intervention.

5. A computing device comprising a non-transitory computer usable medium having computer readable program code embodied therein, the code when executed by one or more processors configuring a computer to execute a method for ensuring successful deployment of a design change from a development environment to a user acceptance testing environment, the system comprising: the one or more processors configured, based on the code, to:
- export a development file from a development environment to a user acceptance testing environment;
- generate, based on the export, a skip file as an Extensible Markup Language export (XML-export) script, said skip file that keys off of the development file;
- open, using an Extensible Markup Language table (XML-table) utility in Excel Macros the XML-export script;
- select an option to create an XML schema based on the XML-export script;
- retrieve a first code from the XML schema, said first code that identifies the action to which the XML schema pertains;
- retrieve a second code from the XML schema, said second code that identifies a Relational Security Assessment Manager identifier (RSAM ID) to which the XML schema pertains;
- use the first code and the second code to determine an event handler name to which the XML schema pertains;
- use the RSAM ID and invoke the event handler name to return to the XML-export script and correct the XML schema;
- repeat the method for a plurality of skip files;
- parse a single aggregated file into a plurality of skip files, said parsing comprising using artificial intelligence to parse said single aggregated file; and
- wherein said using artificial intelligence to parse said single aggregated file comprises determining a baseline characteristic for the parsing based on a set of legacy skip files and a set of previously-generated skip files,
- wherein said using artificial intelligence to parse said single aggregated file further comprises using artificial intelligence for automatically remediating the skip files.

6. The computing device of claim 5 wherein the one or more processors is configured to use an Excel Macros Software Development Kit to prepare an Excel macro, said macro that implements the method absent human intervention.

* * * * *